United States Patent
Kumar et al.

(10) Patent No.: US 9,329,796 B2
(45) Date of Patent: May 3, 2016

(54) MANAGEMENT OF MEMORY PAGES

(71) Applicant: International Business Machines Corporation, Armonk, NY (US)

(72) Inventors: Keerthi B. Kumar, Bangalore (IN); Swetha N. Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/972,129

(22) Filed: Dec. 17, 2015

(65) Prior Publication Data

US 2016/0092142 A1 Mar. 31, 2016

Related U.S. Application Data

(63) Continuation of application No. 14/474,359, filed on Sep. 2, 2014.

(51) Int. Cl.
G06F 12/00 (2006.01)
G06F 3/06 (2006.01)
G06F 12/12 (2016.01)
G06F 9/455 (2006.01)

(52) U.S. Cl.
CPC .............. *G06F 3/0647* (2013.01); *G06F 3/067* (2013.01); *G06F 3/0608* (2013.01); *G06F 9/45533* (2013.01); *G06F 12/123* (2013.01); *G06F 2212/1044* (2013.01); *G06F 2212/154* (2013.01); *G06F 2212/69* (2013.01)

(58) Field of Classification Search
None
See application file for complete search history.

(56) References Cited

U.S. PATENT DOCUMENTS

| 8,019,962 B2 | 9/2011 | Armstrong et al. | |
| 8,140,822 B2 | 3/2012 | Jacobs et al. | |
| 2011/0119427 A1* | 5/2011 | Dow | G06F 9/5088 711/6 |
| 2011/0320556 A1* | 12/2011 | Reuther | G06F 9/4856 709/213 |
| 2015/0135175 A1* | 5/2015 | Bacher | G06F 9/45558 718/1 |
| 2015/0143372 A1* | 5/2015 | Bercovici | G06F 9/45533 718/1 |
| 2015/0339165 A1* | 11/2015 | Tsirkin | G06F 9/5016 718/1 |

* cited by examiner

*Primary Examiner* — Kaushikkumar Patel
(74) *Attorney, Agent, or Firm* — Daniel R. Simek

(57) ABSTRACT

In a method for managing memory pages, responsive to determining that a server is experiencing memory pressure, one or more processors identifying a first memory page in a listing of memory pages in the server. The method further includes determining whether the first memory page corresponds to a logical partition (LPAR) of the server that is scheduled to undergo an operation to migrate data stored on memory pages of the LPAR to another server. The method further includes, responsive to determining that the first memory page does correspond to a LPAR of the server that is scheduled to undergo an operation to migrate data, determining whether to evict the first memory page based on a memory page state associated with the first memory page. The method further includes, responsive to determining to evict the first memory page, evicting data stored in the first memory page to a paging space.

1 Claim, 5 Drawing Sheets

MANAGEMENT OF MEMORY PAGES

BACKGROUND OF THE INVENTION

The present invention relates generally to the field of computer resource management, and more particularly to management of memory pages in a computing environment.

Live Partition Mobility (LPM) is a feature utilized in computer servers and virtual machine environments that allows a running logical partition (LPAR) to be relocated from one computer system to another computer system. In LPM, memory is copied asynchronously from one system to another to create a clone of a running partition with "dirty" pages being re-copied as necessary. LPM can be utilized to transmit data stored on memory pages from one system to another. A memory page is a fixed-length contiguous block of virtual memory. For example, a server computer includes dynamic random-access memory (DRAM), which is allocated to one or more LPARs of the server computer. The DRAM is divided into a pool of "chunks" of memory, and each chunk is referred to as a memory page.

A hypervisor or virtual machine monitor (VMM) is a piece of computer software, firmware, or hardware that creates and runs virtual machines. In an Active Memory Sharing (AMS) environment, a hypervisor can provide a loan of memory pages from LPARs that are not using the memory pages to LPARs that are experiencing increased memory pressure. AMS provides system memory virtualization capabilities, allowing multiple LPARs to share a common pool of virtual memory.

SUMMARY

Aspects of the present invention disclose a method, computer program product, and system for managing memory pages. The method includes in response to determining that a server is experiencing memory pressure, one or more processors identifying a first memory page in a listing of memory pages in the server. The method further includes one or more processors determining whether the first memory page corresponds to a logical partition (LPAR) of the server that is scheduled to undergo an operation to migrate data stored on memory pages of the LPAR to another server. The method further includes, responsive to determining that the first memory page does correspond to a LPAR of the server that is scheduled to undergo an operation to migrate data stored on memory pages of the LPAR to another server, one or more processors determining whether to evict the first memory page based on a memory page state associated with the first memory page. The method further includes, responsive to determining to evict the first memory page, one or more processors evicting data stored in the first memory page to a paging space.

DETAILED DESCRIPTION

Embodiments of the present invention allow for classifying memory pages and identifying sets of memory pages to page-out to a paging space. In one embodiment, memory pages in a server computer environment are classified based on whether the memory pages have been transmitted to a target server or modified by a source server. In another embodiment, in situations of increased memory pressure, data stored on a memory page can be paged-out to a paging space.

Some embodiments of the present invention recognize that a delay is associated with unnecessary page-in and page-out activity. Avoiding unnecessary page-in and page-out activity can lead to an increase in central processing unit (CPU) resource utilization efficiency and increasing the overall performance of a hypervisor.

Figure 1:
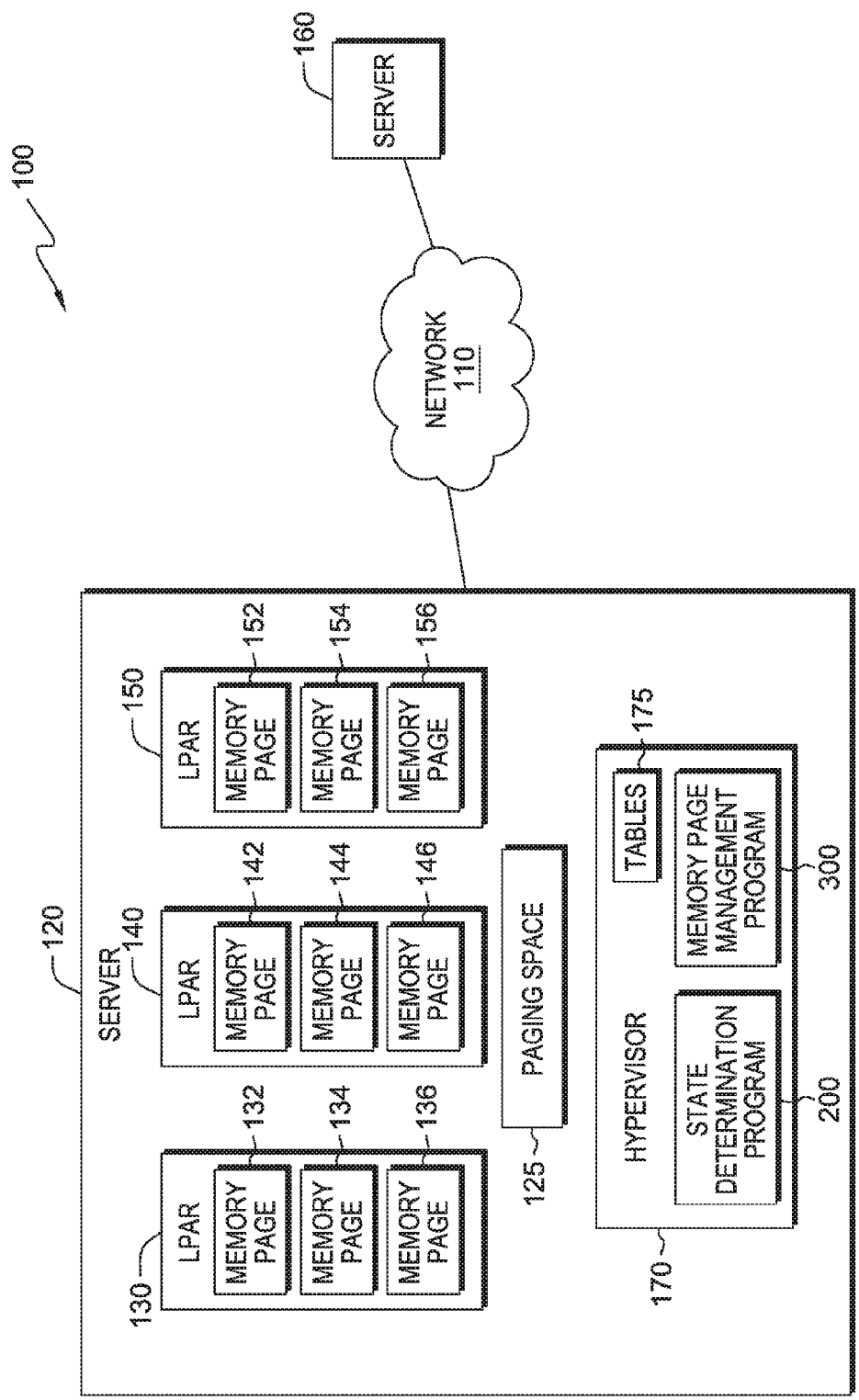
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention.

An embodiment of data processing environment 100 includes servers 120 and 160, interconnected over network 110. In one embodiment, data processing environment 100 is a computing environment that supports Active Memory Sharing (AMS) and utilizes Live Partition Mobility (LPM) to transmit and transfer data between servers 120 and 160.

In one embodiment, servers 120 and 160 communicate through network 110. Network 110 can be, for example, a local area network (LAN), a telecommunications network, a wide area network (WAN) such as the Internet, or any combination of the three, and include wired, wireless, or fiber optic connections. In general, network 110 can be any combination of connections and protocols that will support communications between servers 120 and 160, in accordance with embodiments of the present invention.

In example embodiments, servers 120 and 160 can be desktop computers, computer servers, or any other computer systems known in the art. In certain embodiments, servers 120 and 160 represent computer systems utilizing clustered computers and components (e.g., database server computers, application server computers, etc.) that act as a single pool of seamless resources when accessed by elements of data processing environment 100 (e.g., servers 120 and 160). In general, servers 120 and 160 are representative of any electronic device or combination of electronic devices capable of executing computer readable program instructions. Servers 120 and 160 may include components as depicted and described in further detail with respect to FIG. 5, in accordance with embodiments of the present invention.

Server 120 includes paging space 125, LPARs 130, 140, and 150, and hypervisor 170. In one embodiment, server 120 hosts one or more virtual machines that utilize computer resources of server computer 120 (e.g., CPUs, computer memory, storage, etc.). LPARs 130, 140, and 150 are logical partitions that include allocated hardware resources of server 120. In various embodiments, LPARs 130, 140, and 150 include respective instances of memory pages 132, 134, 136, 142, 144, 146, 152, 154, and 156. In other embodiments, server 120 can host additional LPARs, each including allocated memory pages. A memory page is a fixed-length contiguous block of virtual memory. For example, server 120 includes dynamic random-access memory (DRAM), which is allocated to LPARs 130, 140, and 150. The DRAM is divided into a pool of "chunks" of memory, and each chunk is referred to as a memory page. Memory pages of LPARs (e.g., memory pages 132, 134, and 136 of LPAR 130, etc.) store data that can be transmitted to a target server (e.g., server 160) and paged-out to paging space 125. In an example embodiment, processes that run on LPAR 140 utilize and modify one or more of memory pages 142, 144, and 146 during operation of the process. Hypervisor 170 manages memory pages of server 120, as well as other resources of server 120 associated with virtual computing.

Paging space 125 is a storage location in server 120 (e.g., a hard disk drive (HDD), solid-state drive (SSD), etc.) that server 120 and hypervisor 170 utilize to store data that has been paged-out (e.g., by memory page management program 300) from memory pages LPARs 130, 140, and 150 of server 120. If the paged-out data is needed again by the corresponding LPAR, then the data can be paged-in to the corresponding LPAR (e.g., by hypervisor 170). For example, paging space 125 is a virtual I/O server (VIOS) paging space that server 120 utilizes. Paging space 125 can be implemented with any type of storage device; for example, persistent storage 508 (discussed with reference to FIG. 5 below), which is capable of storing data that may be accessed and utilized by server 120 and hypervisor 170, such as a database server, a hard disk drive, or a flash memory. In other embodiments, paging space 125 can represent multiple storage devices within server 120.

In various embodiments, server 160 is a target or destination server for transmission of data from memory pages of server 120 in LPM operations. Server 160 can be any type of server computer that supports LPM operations. In another embodiment, server 160 is managed by a hypervisor (not shown), which is capable of communicating with hypervisor 170, via network 110. In an example embodiment, LPAR 150 undergoes a LPM operation to transmit data stored on memory pages 152, 154, and 156 to server 160.

Hypervisor 170 is a piece of computer software, firmware, or hardware that creates and runs virtual machines and LPARs 130, 140, and 150 in server 120. A hypervisor is a program that allows multiple operating systems (or LPARs) to share computer resources of a single host (e.g., server 120). In LPM environments, hypervisor 170 can provide a loan of memory pages from LPARs that are not using the memory pages to LPARs that are experiencing increased memory pressure. For example, if LPAR 130 is experiencing increased memory pressure and LPAR 150 is not utilizing memory page 152, then hypervisor 170 can loan memory page 152 to LPAR 130. In various embodiments, hypervisor 170 can be hypervisor software hosted on a server computer. In additional embodiments, hypervisor 170 can be hosted on one or more of servers 120 and 160 or in another server computer or computing device capable of communicating via network 110.

Hypervisor 170 includes tables 175, state determination program 200, and memory page management program 300. Tables 175 includes tables of data and other data structures that hypervisor 170 utilizes to manage LPARs 130, 140, and 150, and respective memory pages. Tables 175 can include page frame tables (PFT) associated with memory pages in server 120. The PFTs can be associated with a corresponding instance of a memory page, and include information associated with the location and use of the memory page, and in a format that state determination program 200 and memory page management program 300 are capable of utilizing. In various embodiments, a PFT is metadata associated with a memory page and contains information about the memory page (e.g., pin count, page segment, and other bits of information).

Figure 4A:
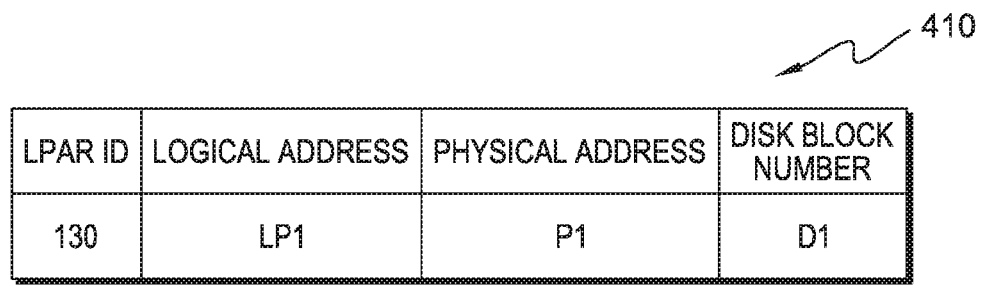
FIG. 4A is an example depiction of an entry in a hypervisor translation table populated with information corresponding to a memory page, in accordance with an embodiment of the present invention.

In one embodiment, tables 175 includes a hypervisor translation table, which stores location information corresponding to memory pages (e.g., physical storage addresses, logical storage addresses, etc.). Hypervisor translation table entry 410 (FIG. 4A) is an example of an entry for memory page 132 in a hypervisor translation table in tables 175. Hypervisor translation table entry 410 includes a "LPAR ID" column, which provides an indication that memory page 132 is allocated to LPAR 130. Hypervisor translation table entry 410 is stored in tables 175 in a format that state determination program 200 and memory page management program 300 are capable of utilizing. Hypervisor 170 populates information in the hypervisor translation table based on information associated with memory pages (e.g., information in a PFT associated with a memory page, etc.) and in response to an update in data associated with a memory page.

In another embodiment, tables 175 includes a LPM memory page migration list, which includes information corresponding to memory pages that are to be transmitted in a LPM operation. For example, in a LPM operation for memory pages of LPAR 140 to server 160, the LPM memory page migration list would include information corresponding to memory pages 142, 144, and 146. Information included in the LPM memory page migration list includes, but is not limited to, a current storage location of a memory page, a real page number (RPN) of the memory page, a source storage location of the memory page (e.g., in server 120), and a target storage location of the memory page (e.g., in server 160). Hypervisor 170 populates information in the memory page migration list in response to LPM operations that are requested on servers 120 and 160.

Figure 4B:
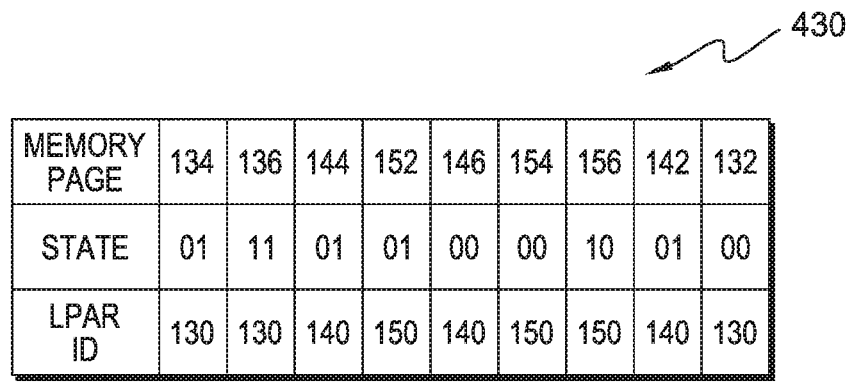
FIG. 4B is an example depiction of a least recently used (LRU) list of memory pages for use in a LRU algorithm for managing use of memory pages, in accordance with an embodiment of the present invention.

In another embodiment, tables 175 includes a least recently used (LRU) list of memory pages for use in a LRU algorithm for managing use of memory pages in server 120, or state determination program 200, and memory page management program 300. The LRU list provides a listing of memory pages of server 120, with the least recently used memory pages appearing first. Example LRU list 430 (FIG. 4B) is an example depiction of a LRU list, which can be stored in tables 175 and that memory page management program 300 is capable of utilizing. In various embodiments, example LRU list 430 includes a "memory page" row that provides the memory pages of server 120 in least recently used order, a "state" row that provides the memory states corresponding to memory pages, and a "LPAR ID" row that provides an identification of the LPAR that corresponds to a memory page. In example embodiments, hypervisor 170 (e.g., utilizing state determination program 200) operates to determine and store memory states for memory pages and stores the determined memory states in the LRU list (e.g., example LRU list 430).

In another embodiment, tables 175 includes a hypervisor order table. The hypervisor order table includes IDs of LPARs that are undergoing a LPM operation (e.g., LPARs 130, 140, and 150). In various embodiments, hypervisor 170 populates, or updates, the hypervisor order table in response to LPM operations being requested and initiating on servers 120 or 160.

State determination program 200 determines memory page states for memory pages of server 120, in accordance with embodiments of the present invention. Memory page management program 300 manages memory pages of server 120 based on the corresponding memory states, in accordance with embodiments of the present invention.

Figure 2:
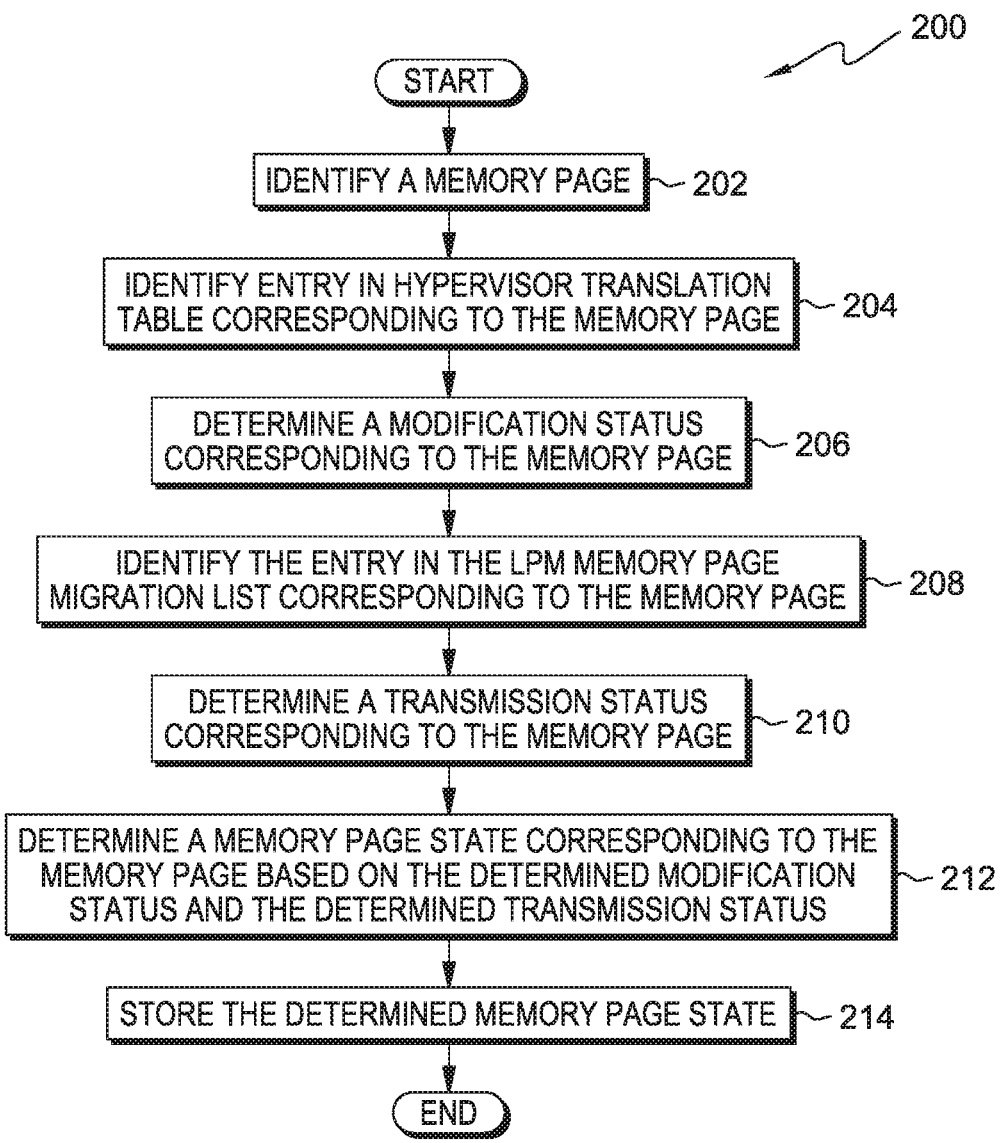
FIG. 2 is a flowchart depicting operational steps of a program for determining memory page states for memory pages in a server computer, in accordance with an embodiment of the present invention.

FIG. 2 is a flowchart depicting operational steps of state determination program 200, a program for determining memory page states for memory pages in a server computer, in accordance with an embodiment of the present invention. In one embodiment, state determination program 200 operates on hypervisor 170 to analyze memory pages 132, 134, 136, 142, 144, 146, 152, 154, and 156 in respective LPARs 130, 140, and 150 of server 120. In various embodiments, state determination program 200 can initiate periodically (e.g., every 5 seconds, every minute, etc.), in response to a LPM operation, and in response to a user request (e.g., from an administrator of hypervisor 170). In an example embodiment, state determination program 200 initiates in response to a modification to a memory page (e.g., a modification that results in a change to a page state) by a process operating on a LPAR. State determination program 200 can receive an indication that a memory page has been modified or that a page state change has occurred in the form of a notification sent to hypervisor 170 for the corresponding LPAR.

In step 202, state determination program 200 identifies a memory page. In one embodiment, state determination program 200 identifies one of memory pages 132, 134, 136, 142, 144, 146, 152, 154, and 156. In another embodiment, state determination program 200 identifies more than one memory page. State determination program 200 can utilize a variety of methodologies and factors to determine which memory page to identify. For example, state determination program 200 identifies memory pages in the order of the physical addresses of the memory pages in the computer memory of server 120. In other examples, state determination program 200 identifies memory pages based on which LPAR the memory pages are allocated to or based on a predefined order (e.g., by an administrator of hypervisor 170). In one embodiment, state determination program 200 initiates in response to receiving an indication that a process on a LPAR has modified a memory page, and in response, state determination program 200 identifies the modified memory page. In this embodiment, a LPAR that modifies a memory page sends the logical address of the memory page to hypervisor 170, and additional information associated with the modification of the memory page (e.g., LPAR ID, etc.), for storage in the hypervisor translation table.

In step 204, state determination program 200 identifies an entry in the hypervisor translation table corresponding to the memory page. In one embodiment, state determination program 200 identifies the entry in the hypervisor translation table, a component of tables 175 in hypervisor 170, which corresponds to the memory page identified in step 202. In one example, state determination program 200 identifies memory page 132 of LPAR 130 (in step 202), and then state determination program 200 identifies the corresponding entry in the hypervisor translation table. In this example, state determination program 200 identifies hypervisor translation table entry 410 (FIG. 4A), which is an example depiction of an entry in a translation table of hypervisor 170 that corresponds to memory page 132.

A hypervisor translation table can include a plurality of entries that correspond to respective memory pages of server 120. In one embodiment, hypervisor translation table entry 410 includes a "LPAR ID" column, which provides an indication that memory page 132 is allocated to LPAR 130. State determination program 200 can utilize the "LPAR ID" column of hypervisor translation table entry 410 to determine that the logical address of memory page 132 (via the "logical address" column) is actually from LPAR 130.

In step 206, state determination program 200 determines a modification status corresponding to the memory page. In one embodiment, state determination program 200 utilizes the identified entry in the hypervisor translation table (e.g., hypervisor translation table entry 410 from step 204) to determine a modification status corresponding to memory page 132. In an additional embodiment, state determination program 200 utilizes a logical address of a memory page and a corresponding real page number (RPN) (e.g., an actual physical address of the memory page) to determine a modification status corresponding to the memory page. The modification status that state determination program 200 determines indicates whether or not a process of a LPAR has modified the memory page (e.g., a process of LPAR 130 utilizing memory page 132, a process on LPAR 130 reading pages of a program into memory, etc.). State determination program 200 stores the determined modification status in a page frame table (PFT) associated with the memory page. For example, state determination program 200 sets a value in the PFT associated with memory page 132 to "0" if memory page 132 is modified and the value to "1" if memory page has not been modified.

In an example embodiment, an operating system that is running on LPAR 130 utilizes and knows the logical address of memory page 132 (and any other memory pages). Hypervisor 170 utilizes and knows the physical address of memory page 132 (and all other memory pages in server 120, i.e., the server that hypervisor 170 manages). In response to a process running on LPAR 130 modifying memory page 132, the corresponding PFT "modification bit" entry is set to indicate that memory page 132 has been modified (e.g., the modification bit is set to "1"). Then, the operating system can invoke hypervisor 170 to send the logical address of memory page 132 (i.e., the modified memory page) and the corresponding LPAR ID (i.e., LPAR 130) to add to the hypervisor translation table. State determination program 200 utilizes the hypervisor translation table and the indication in the PFT to determine that memory page 132 has been modified and has a modification status of "modified."

In step 208, state determination program 200 identifies the entry in the LPM memory page migration list corresponding to the memory page. In one embodiment, state determination program 200 accesses the LPM memory page migration list to identify the entry that corresponds to the memory page identified in step 202. In example embodiments, the memory page migration list can be located in tables 175 of hypervisor 170, in servers 120 and 160, or in another location that is accessible via network 110. The LPM memory page migration list includes information corresponding to memory pages that are to be transmitted in a LPM operation. For example, in a LPM operation for memory pages of LPAR 140 to server 160, the LPM memory page migration list would include information corresponding to memory pages 142, 144, and 146. Information included in the LPM memory page migration list includes, but is not limited to, a current storage location of a memory page, a RPN of the memory page, a source storage location of the memory page (e.g., in server 120), and a target storage location of the memory page (e.g., in server 160).

In another embodiment, state determination program 200 utilizes the identified entry in the LPM memory page migration and an RPN of a memory page to determine whether the memory page is "clean" or "dirty." A clean memory page has already been transmitted from the source server to the target server. A dirty memory page has not yet been transmitted to the target server, or has already been transmitted to the target server, but the memory page has been modified by the source server.

In the previously discussed example of state determination program 200 identifying memory page 132, state determination program 200 accesses the LPM memory page migration list and identifies the entry that corresponds to memory page 132.

In step 210, state determination program 200 determines a transmission status corresponding to the memory page. In one embodiment, state determination program 200 utilizes the identified entry corresponding to the memory page in the LPM memory page migration list (e.g., whether a memory page is "clean" or "dirty") to determine a transmission status corresponding to the memory page. The transmission status that state determination program 200 determines provides an indication of whether or not a memory page (that is present in the LPM memory page migration table) has been transmitted to the target server. In various embodiments, the entry corresponding to the memory page in the LPM memory page migration list provides an indication of whether or not the memory page has been transmitted to the target server. State determination program 200 stores the determined transmission status in metadata associated with the memory page. For example, state determination program 200 stores an indication in metadata associated with memory page 132 of "0" if memory page 132 is transmitted and a value of "1" if memory page has not been transmitted.

In the previously discussed example of state determination program 200 identifying memory page 132, state determination program 200 utilizes the identified entry in the LPM memory page migration list corresponding to memory page 132 to determine which server computer (i.e., server 120 or server 160) memory page 132 is currently located on. In this example, if the RPN indicates that memory page 132 is located on server 120, then state determination program 200 determines a transmission status for memory page 132 of not transmitted. If the RPN indicates that memory page is located on server 160, then state determination program 200 determines a transmission status for memory page 132 of transmitted. In this example, state determination program 200 stores the determined transmission state corresponding to memory page 132 in metadata associated with memory page 132. In another example embodiment, state determination program 200 utilizes the indication in the LPM memory page migration list of whether memory page 134 is "clean" or "dirty" to determine the transmission status corresponding to memory page 132.

In step 212, state determination program 200 determines a memory page state corresponding to the memory page based on the determined modification status and the determined transmission status. In one embodiment, state determination program 200 utilizes the determined modification status (from step 206) and the determined transmission status (from step 210) for a memory page to determine a memory page state of the memory page. The memory page state provides an indication of the modification status and the transmission status for a memory page that hypervisor 170 can utilize (e.g., in memory page management program 300). In example embodiments, state determination program 200 can access metadata associated with a memory page (e.g., a PFT) to utilize the determined modification status and transmission status. In one embodiment, initially each memory page will have an associated memory page state of "not modified and not transmitted."

In a first example, state determination program 200 determines that memory page 132 has a modification status of "modified" and a transmission status of "transmitted." Therefore, state determination program 200 determines the memory page state for memory page 132 to be "transmitted and modified." In an example embodiment, state determination program 200 determines the memory page state for memory page 132 to be "00," which provides an indication to hypervisor 170 (and memory page management program 300) that memory page 132 has been transmitted and modified. A memory page with a memory page state of "transmitted and modified" or "00" indicates that the memory page has already been transmitted to the target server of the LPM operation (e.g., server 160), but the memory page has also been modified (e.g., by a process running on LPAR 130 of server 120, after transmission to the target server).

In a second example, state determination program 200 determines that memory page 132 has a modification status of "not modified" and a transmission status of "transmitted." Therefore, state determination program 200 determines the memory page state for memory page 132 to be "transmitted and not modified." In an example embodiment, state determination program 200 determines the memory page state for memory page 132 to be "01," which provides an indication to hypervisor 170 (and memory page management program 300) that memory page 132 has been transmitted and not modified. A memory page with a memory page state of "transmitted and not modified" or "01" indicates that the memory page has already been transmitted to the target server of the LPM operation (e.g., server 160), but the memory page has not been modified (e.g., by a process running on LPAR 130).

In a third example, state determination program 200 determines that memory page 132 has a modification status of "modified" and a transmission status of "not transmitted." Therefore, state determination program 200 determines the memory page state for memory page 132 to be "not transmitted and modified." In an example embodiment, state determination program 200 determines the memory page state for memory page 132 to be "10," which provides an indication to hypervisor 170 (and memory page management program 300) that memory page 132 has not been transmitted but has been modified. A memory page with a memory page state of "not transmitted and modified" or "10" indicates that the memory page has not yet been transmitted to the target server of the LPM operation (e.g., server 160), but the memory page has been modified (e.g., by a process running on LPAR 130).

In a fourth example, state determination program 200 determines that memory page 132 has a modification status of "not modified" and a transmission status of "not transmitted." Therefore, state determination program 200 determines the memory page state for memory page 132 to be "not transmitted and not modified." In an example embodiment, state determination program 200 determines the memory page state for memory page 132 to be "11," which provides an indication to hypervisor 170 (and memory page management program 300) that memory page 132 has not been transmitted and has not been modified. A memory page with a memory page state of "not transmitted and not modified" or "11" indicates that the memory page has not yet been transmitted to the target server of the LPM operation (e.g., server 160), and the memory page has not been modified (e.g., by a process running on LPAR 130).

In step 214, state determination program 200 stores the determined memory page state. In one embodiment, state determination program 200 stores the determined memory page state as metadata (e.g., a table, an entry in a PFT) that is associated with the memory page. In example embodiments, the stored determined memory state is in a format that hypervisor 170 and memory page management program 300 are capable of utilizing. In additional embodiments, after storing the determined memory page state, state determination program 200 continues operation to determine memory states for additional memory pages in a server (e.g., memory pages 132, 134, 136, 142, 144, 146, 152, 154, and 156 in server 120).

Figure 3:
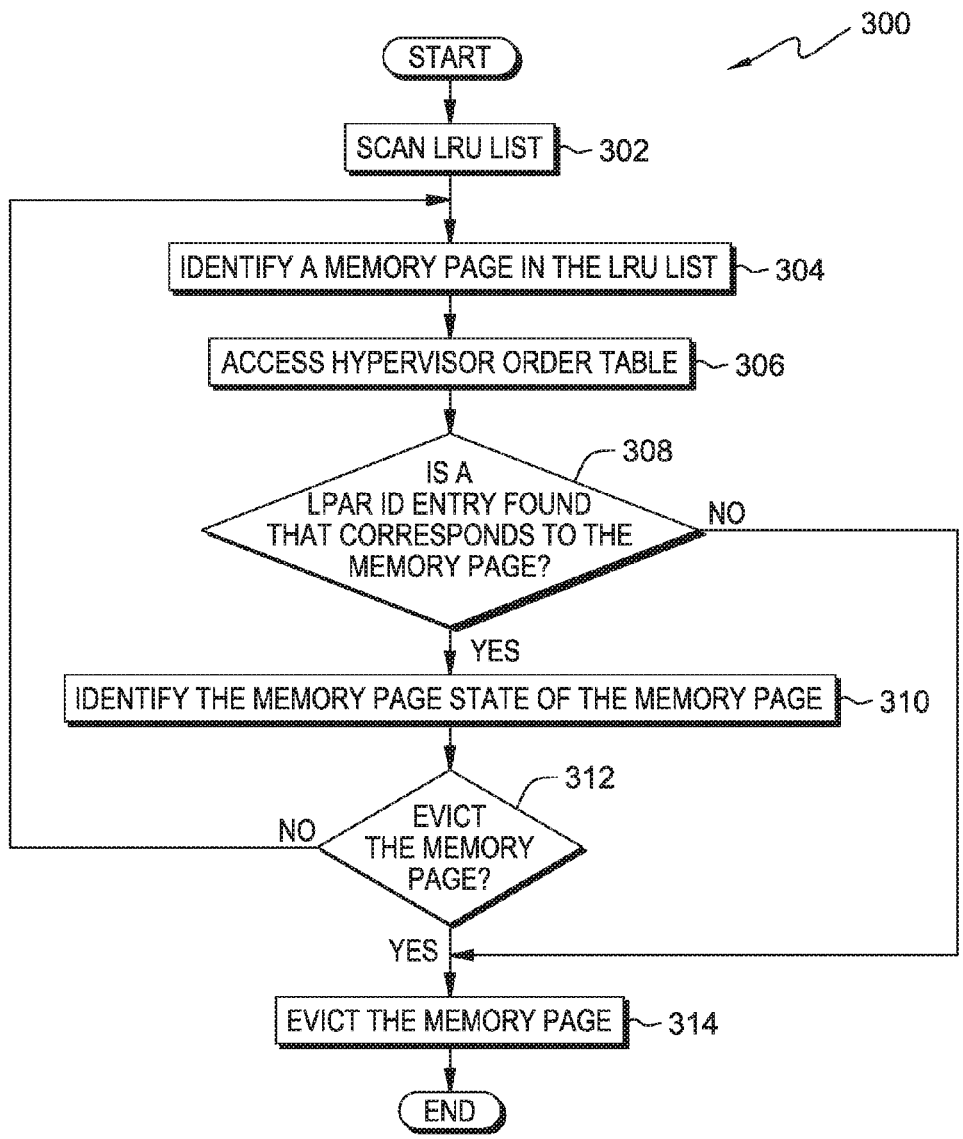
FIG. 3 is a flowchart depicting operational steps of a program for managing page-in and page-out activity of memory pages to a paging space, in accordance with an embodiment of the present invention.

FIG. 3 is a flowchart depicting operational steps of memory page management program 300, a program for managing page-in and page-out activity of memory pages to a paging space, in accordance with an embodiment of the present invention. In one embodiment, memory page management program 300 initiates in response to an increase in memory pressure in server 120 (e.g., in one or more of LPARs 130, 140, and 150). In other embodiments, memory page management program 300 initiates at peak memory utilization of server 120, or the number of free memory pages in server 120 is below a defined threshold. In example embodiments, memory page management program 300 is a function of a least recently used (LRU) algorithm for managing use of memory pages in server 120. In another embodiment, memory page management program 300 can operate simultaneously with state determination program 200.

In step 302, memory page management program 300 scans the LRU list. The LRU list provides a listing of memory pages of server 120, with the least recently used memory pages appearing first. In one embodiment, in response to a scarcity of free memory pages in server 120, or increased memory pressure, memory page management program 300 starts scanning the LRU list from the beginning of the list to the end. In other embodiments, memory page management program 300 can utilize other forms of memory page management algorithms (e.g., other cache algorithms). Example LRU list 430 is an example depiction of a LRU list that memory page management program 300 utilizes. The "memory page" row provides the memory pages of server 120 in least recently used order, the "state" row provides the determined memory states (determined and stored by state determination program 200) corresponding to memory pages, and a "LPAR ID" row provides an identification of the LPAR that corresponds to a memory page. In other embodiments, where state determination program 200 has not yet run, the LRU list can default to having a state value of "11" (i.e., not transmitted and not modified) associated with each memory page.

In step 304, memory page management program 300 identifies a memory page in the LRU list. In one embodiment, memory page management program 300 identifies the first memory page in the LRU list that memory page management program 300 has not yet analyzed. For example, in the first pass through memory page management program 300 identifies the first memory page in the LRU list, in the second pass through memory page management program 300 identifies the second memory page in the LRU list, etc. In additional embodiments, memory page management program 300 can identify multiple memory pages in the LRU list.

In step 306, memory page management program 300 accesses the hypervisor order table. The hypervisor order table includes IDs of LPARs that are undergoing a LPM operation (e.g., LPARs 130, 140, and 150). In one embodiment, memory page management program 300 accesses the hypervisor order table, which is stored in tables 175 of hypervisor 170.

In decision step 308, memory page management program 300 determines whether a LPAR ID entry is found that corresponds to the memory page. In one embodiment, memory page management program 300 determines whether a LPAR ID entry is found in the hypervisor order table that corresponds to the memory page identified in step 304. Memory page management program 300 utilizes a LPAR ID (e.g., LPAR 130, 140, or 150) associated with identified memory page (from step 208) to search the hypervisor order table. If memory page management program 300 finds the LPAR ID in the hypervisor order table, then that LPAR is undergoing a LPM operation.

In an example, memory page management program 300 identifies memory page 134 in example LRU list 430 (in step 304), which corresponds to LPAR 130. Then memory page management program 300 accesses the hypervisor order table and searches the hypervisor order table for an indication that LPAR 130 is undergoing a LPM operation.

In step 310, memory page management program 300 identifies the memory page state corresponding to the memory page. In one embodiment, responsive to determining that the LPAR entry corresponding to the memory page is found in the hypervisor order table (decision step 308, "yes" branch), memory page management program 300 identifies the memory page state of the memory page. In various embodiments, the memory page state was determined by state determination program 200 and stored in association with the memory page. In example embodiments, the memory page state includes indications of whether the memory page has been transmitted and/or modified (e.g., memory page states of 00, 01, 10, and 11).

In one example, memory page management program 300 determines the memory page state corresponding to a memory page utilizing the "state" column in example LRU list 430 (i.e., a memory page state of "01" corresponds to memory page 134, a memory page state of "11" corresponds to memory page 136, etc.). In another example, memory page management program 300 determines the memory page state corresponding to a memory page utilizing metadata associated with the memory page (e.g., a PFT associated with the memory page, etc.).

In step 312, memory page management program 300 determines whether to evict the memory page. In one embodiment, based on the identified memory page state (from step 310), memory page management program 300 determines whether to evict the memory page. If the memory page state for the memory page (identified in step 310) is "01" (i.e., "transmitted and not modified"), then memory page management program 300 determines to evict the memory page to paging space 125. If the memory page state for the memory page is "00," "10," or "11," then memory page management program 300 determines to not evict the memory page (decision step 312, "no" branch), and memory page management program 300 returns to step 304. In various embodiments, memory page management program 300 does not evict memory pages with a memory page state of "00," "10," or "11," because doing so may lead to additional and unnecessary page-in and page-out activity (e.g., with paging space 125). For example, a memory page with a state of "00" or "10" is "not transmitted" and should be retransmitted prior to being eligible for evicting (i.e., if the page is evicted, additional page-in and page-out activity may be necessary). In another example, if memory page management program 300 evicts a memory page with a state of "11" to paging space 125, then the memory page will have to be paged-in from paging space 125 in order to transmit the memory page to the target server.

In one example utilizing example LRU list 430, memory page management program 300 determines to evict memory page 134 because memory page 134 has a corresponding memory page state of "01." In another example utilizing example LRU list 430, memory page management program 300 determines to not evict memory page 136 because memory page 136 has a corresponding memory page state of "11" (i.e., not "01").

In step 314, memory page management program 300 evicts the memory page. In one embodiment, responsive to determining to evict the memory page (decision step 312, "yes" branch), memory page management program 300 evicts the memory page. In another embodiment, responsive to determining that a LPAR ID entry is not found in the hypervisor order table that corresponds to the memory page, i.e., the LPAR associated with the memory page is not undergoing an LPM operation (decision step 308, "no" branch), memory page management program 300 evicts the memory page. In additional embodiments where memory pressure still exists (i.e., more memory pages need to be evicted), memory page management program 300 returns to step 302 and repeats.

In example embodiments of an evicting process, memory page management program 300 determines to evict memory page 134 (in decision step 312). Memory page management program 300 "evicts" the data that is stored in memory page 134 to paging space 125. Paging space 125 is a storage location in server 120 for the evicted data from memory pages in server 120. In evicting the data from memory page 134, memory page management program 300 removes the data from memory page 134 and sends, or "pages-out," the data for storage in paging space 125. Once memory page management program 300 evicts the data from memory page 134, memory page 134 is identified (e.g., by hypervisor 170) as a free memory page and is added to a listing of free memory pages. Free memory pages can be given to a new process or a currently running process, which can be located on server 120 (e.g., on any of LPARs 130, 140, and 150 of server 120). If the process that was utilizing the data that memory page management program 300 "paged-out" to paging space 125 is calling to utilize that data, then the "evicted" data can be "paged-in" to the LPAR that the process is operating on (e.g., memory pages 132, 134, and 136 of LPAR 130 or another memory page that LPAR 130 is utilizing).

Figure 5:
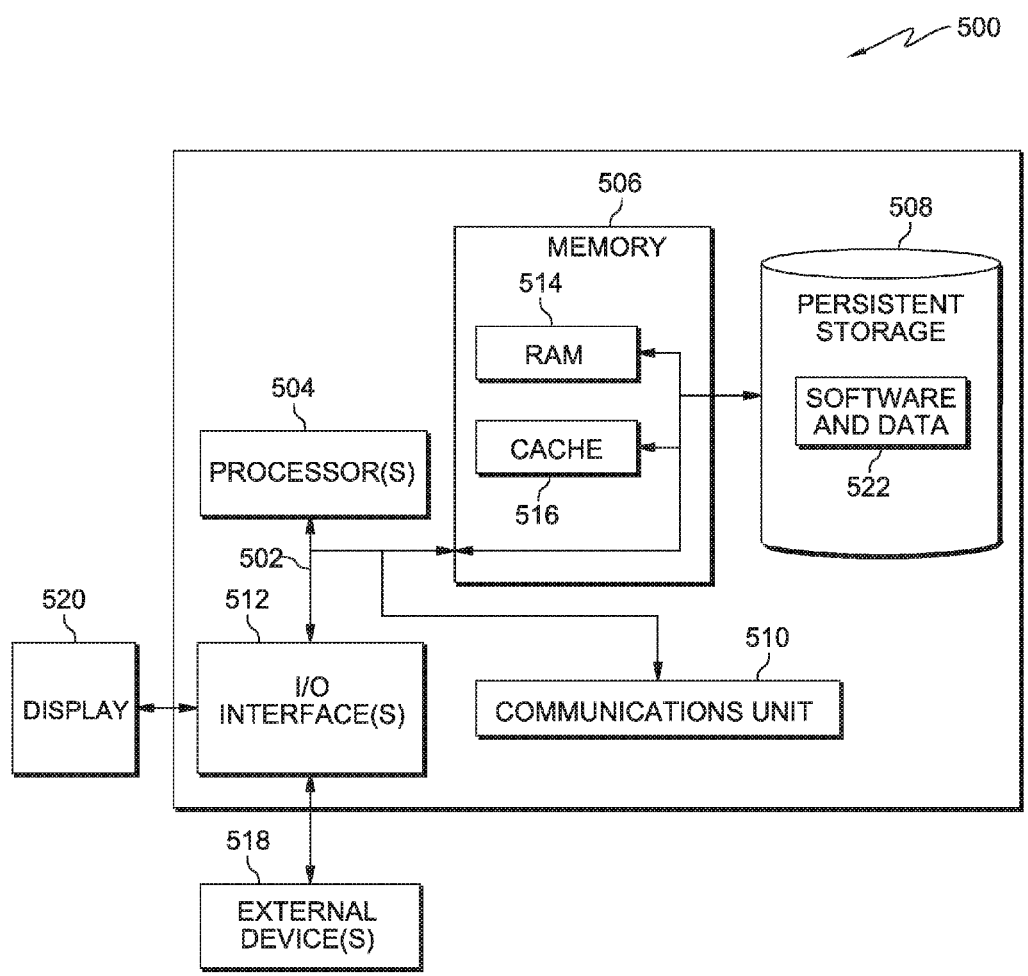
FIG. 5 depicts a block diagram of components of a computing system representative of the servers and hypervisor of FIG. 1, in accordance with an embodiment of the present invention.

FIG. 5 depicts a block diagram of components of computer 500, which is representative of servers 120 and 160, and hypervisor 170, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media. Software and data 522 are stored in persistent storage 508 for access and/or execution by processors 504 via one or more memories of memory 506. With respect to server 120, software and data 522 includes paging space 125, LPARs 130, 140, and 150, and memory pages 132, 134, 136, 142, 144, 146, 152, 154, and 156. With respect to hypervisor 170, software and data 522 includes state determination program 200, memory page management program 300, and tables 175.

In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 may include one or more network interface cards. Communications unit 510 may provide communications through the use of either or both physical and wireless communications links. Software and data 522 may be downloaded to persistent storage 508 through communications unit 510.

I/O interface(s) 512 allows for input and output of data with other devices that may be connected to computer 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data 522, can be stored on such portable computer readable storage media and can be loaded onto persistent storage 508 via I/O interface(s) 512. I/O interface(s) 512 also can connect to a display 520.

Display 520 provides a mechanism to display data to a user and may be, for example, a computer monitor. Display 520 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing memory pages, the method comprising:
   in response to determining that a server is experiencing memory pressure, identifying, by one or more processors, a first memory page in a listing of memory pages in the server, wherein the listing of memory pages is a least recently used (LRU) list of memory pages of the server for use in a LRU algorithm;
   determining, by one or more processors, a modification status for the first memory page based on an entry in a hypervisor translation table corresponding to the first memory page, wherein the entry in the hypervisor translation table indicates a logical address of the first memory page and a real page number (RPN) corresponding to the first memory page;

storing, by one or more processors, an indication of the determined modification status in a page frame table (PFT) associated with the first memory page;

determining, by one or more processors, a transmission status corresponding to the first memory page based on an entry in a memory page migration list, wherein the entry in the memory page migration list indicates whether data on the first memory page has been transmitted to a target server;

storing, by one or more processors, an indication of the determined transmission status in metadata associated with the first memory page;

determining, by one or more processors, the memory page state associated with the first memory page based on a transmission status and a modification status associated with the first memory page;

determining, by one or more processors, whether the first memory page corresponds to a logical partition (LPAR) of the server that is scheduled to undergo an operation to migrate data stored on memory pages of the LPAR to another server, wherein the operation to migrate data stored on memory pages of the LPAR to another server is a Live Partition Mobility (LPM) operation;

responsive to determining that the first memory page does correspond to a LPAR of the server that is scheduled to undergo an operation to migrate data stored on memory pages of the LPAR to another server, determining, by one or more processors, whether to evict the first memory page based on a memory page state associated with the first memory page;

responsive to determining to evict the first memory page, evicting, by one or more processors, data stored in the first memory page to the paging space, wherein the evicting further comprises:
  determining, by one or more processors, utilizing the memory page state associated with the first memory page, that the data in the first memory page has been transmitted to a target server and that the data has not been modified since the data was transmitted; and
  paging-out, by one or more processors, the data from the first memory page to the paging space, wherein the data from the first memory page is stored in the paging space and is capable of being paged-in to one or more memory pages on the server; and responsive to determining that the first memory page does not correspond to a LPAR of the server that is scheduled to undergo an operation to migrate data stored on memory pages of the LPAR to another server, evicting, by one or more processors, data stored in the first memory page to the paging space.

* * * * *